United States Patent
Li et al.

(10) Patent No.: US 11,505,890 B2
(45) Date of Patent: Nov. 22, 2022

(54) CLOTHES DRYER

(71) Applicants: CHONGQING HAIER WASHING MACHINE CO., LTD., Chongqing (CN); HAIER SMART HOME CO., LTD., Shandong (CN)

(72) Inventors: Wenwei Li, Shandong (CN); Benfu Xing, Shandong (CN); Jinkai Wang, Shandong (CN); Jihui Pan, Shandong (CN); Leilei Ai, Shandong (CN); Zhiwei Zhao, Shandong (CN)

(73) Assignees: CHONGQING HAIER WASHING MACHINE CO., LTD., Chongqing (CN); HAIER SMART HOME CO., LTD., Shandong (CN)

( * ) Notice: Subject to any disclaimer, the term of this patent is extended or adjusted under 35 U.S.C. 154(b) by 189 days.

(21) Appl. No.: 16/760,245

(22) PCT Filed: Oct. 23, 2018

(86) PCT No.: PCT/CN2018/111390
§ 371 (c)(1),
(2) Date: Apr. 29, 2020

(87) PCT Pub. No.: WO2019/085787
PCT Pub. Date: May 9, 2019

(65) Prior Publication Data
US 2020/0354880 A1    Nov. 12, 2020

(30) Foreign Application Priority Data

Nov. 3, 2017   (CN) .......................... 201711072844.7

(51) Int. Cl.
*F26B 19/00*     (2006.01)
*D06F 58/22*     (2006.01)
(Continued)

(52) U.S. Cl.
CPC ......... *D06F 58/22* (2013.01); *B01D 46/0005* (2013.01); *B01D 46/10* (2013.01);
(Continued)

(58) Field of Classification Search
CPC .......... D06F 58/22; D06F 58/02; D06F 58/10; B01D 46/0005; B01D 46/10; B01D 46/4227; B01D 2279/55
(Continued)

(56) References Cited

U.S. PATENT DOCUMENTS

2017/0016172 A1*   1/2017  Lee .......................... D06F 58/22
2017/0342644 A1   11/2017  Lu et al.

FOREIGN PATENT DOCUMENTS

CN            1873085 A    12/2006
CN         101210381 A     7/2008
(Continued)

OTHER PUBLICATIONS

International Search Report (PCT/ISA/210), with translation, and Written Opinion (PCT/ISA/237) dated Jan. 22, 2019, by the Chinese Patent Office as the International Searching Authority for International Application No. PCT/CN2018/111390.

*Primary Examiner* — John P McCormack
(74) *Attorney, Agent, or Firm* — Buchanan Ingersoll & Rooney PC

(57) ABSTRACT

A clothes dryer has a front support and a filter apparatus. The front support includes a drying air duct having an air outlet that communicates with a circulation air duct arranged inside the clothes dryer. An air inlet of the drying air duct communicates with a clothes treating chamber of the clothes dryer. The filter apparatus is inserted into and mounted in the air duct from the air inlet and covers the whole cross section of the drying air duct. The entire filter apparatus can be accommodated and mounted in the internal space of the front support, so that the area of the filter apparatus blocking thread scraps is increased, and the filtering efficiency is improved.

6 Claims, 1 Drawing Sheet

(51) Int. Cl.
    *B01D 46/00*     (2022.01)
    *B01D 46/10*     (2006.01)
    *B01D 46/42*     (2006.01)
    *D06F 58/10*     (2006.01)
    *D06F 58/02*     (2006.01)

(52) U.S. Cl.
    CPC ...... *B01D 46/4227* (2013.01); *B01D 2279/55* (2013.01); *D06F 58/02* (2013.01); *D06F 58/10* (2013.01)

(58) Field of Classification Search
    USPC .................................................... 34/82, 480
    See application file for complete search history.

(56) References Cited

FOREIGN PATENT DOCUMENTS

| | | |
|---|---|---|
| CN | 101392448 A | 3/2009 |
| CN | 203741625 U | 7/2014 |
| CN | 105937162 A | 9/2016 |
| EP | 2559805 A1 | 2/2013 |
| JP | 2014-033841 A | 2/2014 |
| KR | 20050119258 A | 12/2005 |
| KR | 100599038 B1 | 7/2006 |
| KR | 101143685 B1 | 5/2012 |

\* cited by examiner

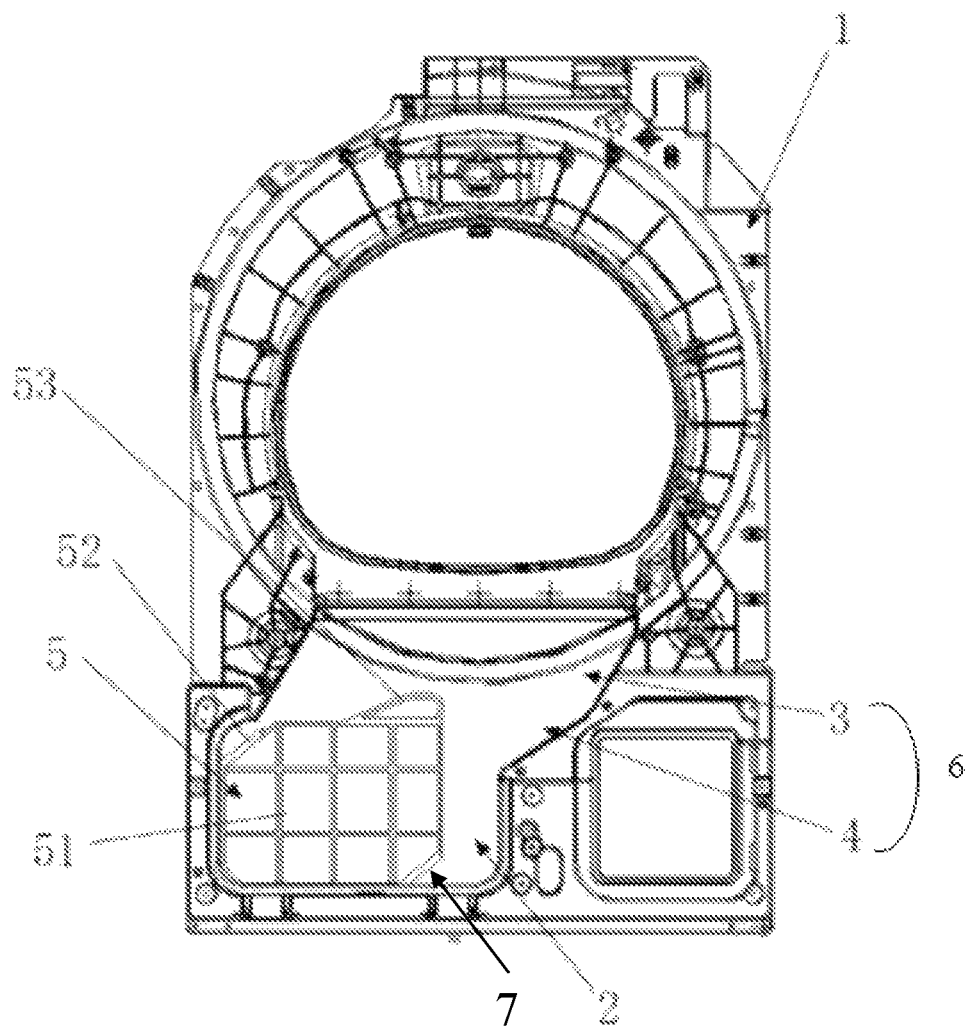

CLOTHES DRYER

TECHNICAL FIELD

The disclosure relates to the field of clothes drying equipment, in particular to clothes dryer with high filtering performance.

BACKGROUND

Fine fluff is produced in the clothes drying process via clothes dryer. Generally, one or two filter nets are arranged under a clothes input of the clothes dryer for filtering fluff, but an enough space is needed for arranging the filter nets, when the space is not large enough, only a layer of filter net can be arranged, the number of meshes of the filter net cannot be large enough, otherwise high wind resistance is produced, and the filter net is liable to be blocked; or in order to mount the filter nets, a filter apparatus picking and placing port is formed in a front panel of the existing clothes dryer, then the overall appearance of the front panel of the clothes dryer is destroyed, the appearance of the clothes dryer is designed with multiple modules, and the overall aesthetic appearance is lost.

A good filtering effect cannot be ensured by a layer of filter net of the clothes dryer. When only a layer of filter net is mounted in the space below the clothes input of the ordinary clothes dryer, in order to ensure the cleanliness of a condenser of the clothes dryer, a second layer of filter net needs to be mounted, and the filter nets cannot be mounted in air ducts of ordinary structures due to the space limitation.

The disclosure with the application number of 200610156184.6 discloses a direct plug-in filter apparatus of a clothes dryer, the direct plug-in filter apparatus is arranged at an inlet of an exhaust duct of the clothes dryer and comprises a filter and a fixing frame of the filter, an insertion port of the fixing frame is formed in a front support of a clothes dryer drum, and the filter is provided with a rectangular outer frame and is inserted into the exhaust duct through an insertion port in the front support by means of the rectangular outer frame, wherein elastic clamping blocks are arranged on the two parallel side surfaces of the rectangular outer frame, limiting clamping holes matched with the elastic clamping blocks are formed in the side walls of the fixing frame, the elastic clamping blocks are clamped in the limiting clamping holes, and thus the service life of the filter apparatus is prolonged while the filter apparatus clamping firmness and accuracy are improved. However, according to the disclosure, quick disassembly and assembly of filter nets are achieved, but the filter nets are not mounted in air ducts and take up a large mounting space, and the two filter nets cannot be mounted conveniently.

In view of this, the present disclosure is proposed.

SUMMARY

The technical problem to be solved by the present disclosure is to overcome the defects in the prior art, and the present disclosure provides a clothes dryer. A whole filter apparatus can be accommodated and mounted in an internal space of a front support, so that the problems that in the prior art, a space in a drying air duct is narrow, only a layer of filter net can be arranged, the number of meshes of the filter net cannot be large enough, otherwise high wind resistance is produced, and the filter net is liable to be blocked are solved. According to the present disclosure, the filter apparatus is entirely arranged in the drying air duct, an area of the filter apparatus blocking thread scraps is increased, and the filtering efficiency is improved.

To solve the above technical problems, a basic idea of the technical solutions adopted by the present disclosure is as follows:

A clothes dryer, comprising a front support and a filter apparatus, wherein the front support is provided with a drying air duct, an air outlet of the drying air duct is communicated with a circulation air duct arranged inside the clothes dryer, an air inlet of the drying air duct is communicated with a clothes treating chamber of the clothes dryer, and the filter apparatus is inserted into and mounted in the drying air duct from the air inlet and covers a whole cross section of the drying air duct.

Preferably, the filter apparatus is wholly inserted into/removed from the drying air duct through the air inlet.

According to the above solution, the filter apparatus is wholly arranged in the drying air duct, thus, the space is saved, it is convenient to mount another filter apparatus at the air inlet of the drying air duct or in the drying air duct, so that the problems that in the prior art, the space in the drying air duct is narrow, only a layer of filter net can be arranged, the number of meshes of the filter net cannot be large enough, otherwise high wind resistance is produced, and the filter net is liable to be blocked are solved. According to the disclosure, the filter apparatus is arranged in the drying air duct wholly, the area of the filter apparatus blocking thread scraps is increased, and the filtering efficiency is improved.

In addition, the filter apparatus is wholly inserted into/removed from the drying air duct through the air inlet, the structure of the drying air duct is simplified advantageously, and the condition that in the prior art, a filter apparatus picking and placing port needs to be formed in a front panel, and the overall appearance effect of the front panel is destroyed is avoided. Meanwhile, if the filter apparatus picking and placing port is formed in the front support, the structural strength of the front support is affected adversely.

Preferably, the drying air duct comprises a mounting chamber, the mounting chamber is aligned with the air outlet of the drying air duct, and the filter apparatus is mounted in the mounting chamber and covers the air outlet.

According to the above solution, the mounting chamber is internally provided with a fixing structure for fixing the filter apparatus: for example, the mounting chamber is internally provided with a clamping portion, and the filter apparatus is clamped and fixed in the mounting chamber, or the mounting chamber is internally provided with an insertion groove, the filter apparatus is of a sheet structure, and the filter apparatus is inserted into and limited in the insertion groove.

Preferably, the drying air duct comprises a guide portion connected to the mounting chamber, and the guide portion is used for guiding the filter apparatus to be inserted into/removed from the mounting chamber.

Preferably, the mounting chamber is located at the air outlet of the drying air duct, so that another filter apparatus is arranged in the drying air duct advantageously.

Preferably, the guide portion is a channel obliquely or vertically, the channel is connected to the mounting chamber, and the filter apparatus is mounting in the mounting chamber through the channel.

Preferably, an end of the guide portion communicates with an inlet of the mounting chamber, and the guide portion is used for guiding the filter apparatus to be directly fixed on the fixing structure in the mounting chamber.

Preferably, the filter apparatus is of the sheet structure, the mounting chamber is matched with the filter apparatus in shape, and the filter apparatus with the sheet structure is wholly mounted in the mounting chamber and covers the cross section of the mounting chamber.

According to the above solution, the mounting chamber and the filter apparatus are matched in shape, and the filter apparatus is located in the mounting chamber wholly, so that the surface of the whole sheet structure can block and filter the thread scraps, the filtration efficiency is improved, the filter net with the large mesh number can be arranged advantageously and is not liable to be blocked, and high wind resistance is not produced.

Preferably, the guide portion is an obliquely channel, and the filter apparatus comprises a beveled structure for avoiding the inner walls of two sides of the guide portion;

Preferably, edges of two sides, being contact with the guide portion, of the filter apparatus are bevel and parallel to each other.

According to the above solution, since the guide portion is arranged obliquely and the two side walls of the guide portion are of a bevel structure, the edges of the two sides, making contact with the inclined guide portion, of the filter apparatus are provided with the parallel bevel edges specially, then cooperation of the filter net and the guide portion is facilitated, the area of the filter net is favorably increased, and the filtering performance is improved, wherein, the guide portion is inclined, can keep away from other structural designs on the clothes dryer, and keeps away from design of a condenser favorably, so that a compact clothes dryer structure is designed.

Preferably, the guide portion comprises a first inclined channel and a second inclined channel communicating with each other, an inlet of the first inclined channel is acted as the air inlet, and a gradient of the first inclined channel is greater than a gradient of the second inclined channel.

Preferably, the first inclined channel and the second inclined channel are in smooth transition.

According to the above solution, the guide portion is arranged as a channel with different gradient at two ends for facilitating mounting of the filter apparatus, the gradient of the first inclined channel is designed to be large, thus, the filter apparatus can be placed in the drying air duct conveniently, and the filter apparatus is convenient to mount. The horizontal length of the cross section of the guide portion in the horizontal direction is longer than the maximum horizontal length of the projection length of the filter apparatus on the horizontal plane; and The horizontal length of a communication port, communicating with the guide portion, of the mounting chamber in the horizontal direction is longer than the projection length of the filter apparatus on the horizontal plane.

According to the above solution, by setting the cross-sectional dimension of the guide portion in the horizontal direction, the filter apparatus can enter the guide portion favorably, normal mounting of the filter apparatus is ensured, when the guide portion is of an inclined structure, the horizontal length of the communication port, communicating with the guide portion, of the mounting chamber in the horizontal direction is longer than the projection length of the filter apparatus on the horizontal plane, and thus the effect that the filter apparatus can enter the mounting chamber through the guide portion is ensured. Preferably, the filter apparatus is of the sheet structure, and the horizontal length of the communication port in the horizontal direction is greater than the length of the diagonal of the sheet structure.

Preferably, the filter apparatus comprises a frame, a filter net arranged in the frame, and a handle part, and the handle part is arranged on the frame and located in the same plane as the filter net.

The handle part faces the air inlet of the drying air duct, and thus a user can grasp the handle part conveniently so as to take the filter apparatus out.

Preferably, an air inlet filter apparatus is arranged at the air inlet of the drying air duct;

Preferably, the air inlet filter apparatus is of a sheet structure, the air inlet filter apparatus is inserted into and fixed at the air inlet of the drying air duct through the air inlet and performs primary filtering in a drying process, and secondary filtering is performed via the filter apparatus mounted in the drying air duct, so that the filtering effect is improved.

Alternatively, the front support is provided with an insertion port connected to the drying air duct, and the air inlet filter apparatus is inserted into the air inlet through the insertion port, or the air inlet filter apparatus is mounted on the upper portion of the air inlet in a covering mode and covers the air inlet so as to block clothes.

Preferably, the number of the meshes of the filter net of the air inlet filter apparatus is smaller than the number of the meshes of the filter apparatus arranged in the drying air duct. In the drying process, the air inlet filter apparatus performs primary filtering on the thread scraps and filters the large thread scraps, the filter apparatus arranged in the drying air duct is used for filtering the tiny thread scraps entering the drying air duct from the air inlet filter apparatus, the two-stage filter apparatuses cooperate for filtration, and a good filtration effect can be achieved.

Certainly, the air inlet filter apparatus may be wholly arranged in the drying air duct and located at an upstream position of the filter apparatus.

By adopting the above technical solutions, the clothes dryer have the following beneficial effects:

1. According to the present disclosure, the whole filter apparatus can be accommodated and mounted in the internal space of the front support, so that the problems that in the prior art, the space in the drying air duct is narrow, only a layer of filter net can be arranged, the number of meshes of the filter net cannot be large enough, otherwise high wind resistance is produced, and the filter net is liable to be blocked are solved. According to the disclosure, the filter apparatus is arranged in the drying air duct wholly, the area of the filter apparatus blocking the thread scraps is increased, and the filtering efficiency is improved.

2. According to the present disclosure, the drying air duct comprises the air inlet communicating with the clothes treating chamber of the clothes dryer, and the filter apparatus is wholly inserted into/removed from the drying air duct through the air inlet. The filter apparatus is wholly inserted into/removed from the drying air duct through the air inlet, thus, the structure of the drying air duct is simplified advantageously, and the condition that in the prior art, the filter apparatus picking and placing port needs to be formed in the front panel, and the overall appearance effect of the front panel is destroyed is avoided. Meanwhile, if the filter apparatus picking and placing port is formed in the front support, the structural strength of the front support is affected adversely.

3. According to the present disclosure, the guide portion is the inclined or vertically arranged channel, the channel communicates with the mounting chamber, and the filter apparatus is mounted in the mounting chamber through the channel. The end of the guide portion communicates with the inlet of the mounting chamber, and the guide portion guides the filter apparatus to be directly fixed on the fixing structure in the mounting chamber.

4. According to the present disclosure, the filter apparatus is of the sheet structure, and the mounting chamber is matched with the filter apparatus in shape. The filter apparatus of the sheet structure is wholly mounted in the mounting chamber and covers the cross section of the mounting chamber. The mounting chamber and the filter apparatus are matched in shape, and the filter apparatus is located in the mounting chamber wholly, so that the surface of the whole sheet structure can block and filter the thread scraps, the filtration efficiency is improved, the filter net with the large mesh number can be arranged advantageously and is not liable to be blocked, and the high wind resistance is not produced.

5. According to the present disclosure, the guide portion is the obliquely channel, and the filter apparatus comprises the bevel structures for avoiding the inner walls of the two sides of the guide portion; preferably, the edges of the two sides, making contact with the inclined guide portion, of the filter apparatus are provided with the parallel bevel edges. Since the guide portion is arranged obliquely and the two side walls of the guide portion are of the bevel structure, the edges of the two sides, making contact with the inclined guide portion, of the filter apparatus are provided with the parallel bevel edges specially, then cooperation of the filter net and the guide portion is facilitated, the area of the filter net is favorably increased, and the filtering performance is improved, wherein, the guide portion is inclined, can keep away from other structural designs on the clothes dryer, and keeps away from the design of the condenser favorably, so that the compact clothes dryer structure is designed.

6. According to the present disclosure, the air inlet filter apparatus is arranged at the air inlet of the drying air duct; the air inlet filter apparatus is inserted into and fixed at the air inlet of the drying air duct through the air inlet and performs primary filtering in the drying process, and secondary filtering is performed through the filter apparatus mounted in the drying air duct, so that the filtering effect is improved.

The embodiments of the present disclosure are described in further detail below with reference to the accompanying drawings.

BRIEF DESCRIPTION OF THE DRAWINGS

The drawings are used as a part of the present application to provide a further understanding of the present disclosure. The schematic embodiments of the present disclosure and the descriptions are used to explain the present disclosure, but do not constitute an improper limitation on the present disclosure. Obviously, the drawings in the following description are only some embodiments, and those of ordinary skill in the art can obtain other drawings based on these drawings without creative efforts. According to the drawing:

FIG. 1 is a schematic structural diagram of a front support of a clothes dryer of the present disclosure.

Wherein: 1. Front support; 2. Mounting chamber; 3. First inclined channel; 4. Second inclined channel; 5. Filter apparatus; 51. Filter net; 52. Frame; 53. Handle part.

It should be noted that the drawing and text descriptions are not intended to limit the scope of the concept of the present disclosure in any way, but rather to explain the concept of the present disclosure to those skilled in the art by referring to specific embodiments.

DETAILED DESCRIPTION

In order to make the objectives, technical solutions and advantages of the embodiments of the present disclosure clearer, the technical solutions in the embodiments will be clearly and completely described with reference to the accompanying drawings in the embodiments of the present disclosure. The following embodiments are used to explain the present disclosure, but not intended to limit the scope of the disclosure.

In the description of the present disclosure, it should be noted that the orientations or positional relationships indicated by the terms "upper", "lower", "inner", "outer" and the like are based on the orientations or positional relationships shown in the drawings, are only for the convenience of describing the present disclosure and simplifying the description, do not indicate or imply that referred devices or elements must have a specific orientation or be constructed and operate in a specific orientation, and therefore cannot be understood as a limitation on the present disclosure.

In the description of the present disclosure, it should be noted that the terms "mounting" and "connection" should be understood in a broad sense unless otherwise specified and limited, for example, it may be fixed connection, detachable connection or integral connection; it may be mechanical connection or electrical connection; and it may be direct connection or indirect connection through an intermediate medium. For those of ordinary skill in the art, the specific meanings of the above terms in the present disclosure can be understood on a case-by-case basis.

The disclosure provides a clothes dryer, the clothes dryer comprises a front support 1 and a filter apparatus 5, the front support 1 is provided with a drying air duct, an air outlet of the drying air duct is communicated with a circulation air duct arranged inside the clothes dryer, an air inlet of the drying air duct is communicated with a clothes treating chamber of the clothes dryer, and the filter apparatus is inserted into and mounted in the drying air duct from the air inlet, and covers the whole cross section of the drying air duct.

Preferably, the filter apparatus 5 is wholly inserted into/removed from the drying air duct through the air inlet.

According to the above solution, the filter apparatus 5 is wholly arranged in the drying air duct, thus, the space is saved, it is convenient to mount the filter apparatus at the air inlet of the drying air duct or in the drying air duct, so that the problems that in the prior art, the space in the drying air duct is narrow, only a layer of filter net can be arranged, the number of meshes of the filter net cannot be large enough, otherwise high wind resistance is produced, and the filter net is liable to be blocked are solved. According to the disclosure, the filter apparatus 5 is arranged in the drying air duct wholly, the area of the filter apparatus blocking thread scraps is increased, and the filtering efficiency is improved.

In addition, the filter apparatus 5 is wholly inserted into/removed from the drying air duct through the air inlet, the structure of the drying air duct is simplified advantageously, and the condition that in the prior art, a filter apparatus picking and placing port needs to be formed in a front panel, and the overall appearance effect of the front panel is destroyed is avoided. Meanwhile, if the filter apparatus picking and placing port is formed in the front support 1, the structural strength of the front support 1 is affected adversely.

Preferably, the drying air duct comprises a mounting chamber 2 which is aligned with the air outlet of the drying air duct, and the filter apparatus is mounted in the mounting chamber 2 and covers the air outlet.

According to the above solution, the mounting chamber 2 is internally provided with a fixing structure for fixing the filter apparatus 5: for example, the mounting chamber 2 is internally provided with a clamping portion, and the filter apparatus 5 is clamped and fixed in the mounting chamber, or the mounting chamber 2 is internally provided with an insertion groove, the filter apparatus 5 is of a sheet structure, and the filter apparatus 5 is inserted into and limited in the insertion groove.

Preferably, the drying air duct comprises a guide portion 6 connected to the mounting chamber 2, and the guide portion 6 is used for guiding the filter apparatus to be inserted into/removed from the mounting chamber 2.

Preferably, the mounting chamber 2 is located at the air outlet of the drying air duct, so that another filter apparatus is arranged in the drying air duct advantageously.

Preferably, the guide portion 6 is a channel obliquely or vertically, the channel is connected to the mounting chamber 2, and the filter apparatus 5 is mounting in the mounting chamber 2 through the channel.

Preferably, an end of the guide portion 6 communicates with an inlet of the mounting chamber 2, and the guide portion 6 is used for guiding the filter apparatus to be directly fixed on the fixing structure in the mounting chamber 2.

Preferably, the filter apparatus 5 is of the sheet structure, the mounting chamber 2 is matched with the filter apparatus 5 in shape, and the filter apparatus with the sheet structure is wholly mounted in the mounting chamber 2 and covers the cross section of the mounting chamber 2.

According to the above scheme, the mounting chamber 2 and the filter apparatus 5 are matched in shape, and the filter apparatus 5 is located in the mounting chamber 2 wholly, so that the surface of the whole sheet structure can block and filter thread scraps, the filtration efficiency is improved, the filter net with the large mesh number can be arranged advantageously and is not liable to be blocked, and the high wind resistance is not produced.

Preferably, the guide portion 6 is the obliquely channel, and the filter apparatus 5 comprises a beveled structure 7 for avoiding the inner walls of the two sides of the guide portion 6;

Preferably, edges of two sides, being contact with the guide portion 6, of the filter apparatus are bevel and parallel to each other.

According to the above solution, since the guide portion 6 is arranged obliquely and the two side walls of the guide portion 6 are of a bevel structure 7, the edges of the two sides, making contact with the inclined guide portion 6, of the filter apparatus 5 are provided with parallel the bevel edges specially, then cooperation of the filter net and the guide portion 6 is facilitated, the area of the filter net is favorably increased, and the filtering performance is improved, wherein, the guide portion 6 is inclined, can keep away from other structural designs on the clothes dryer, and keeps away from design of a condenser favorably, so that a compact clothes dryer structure is designed.

Preferably, the guide portion 6 comprises a first inclined channel 3 and a second inclined channel 4 communicating with each other. An inlet of the first inclined channel 3 is acted as the air inlet, and a gradient of the first inclined channel 3 is greater than a gradient of the second inclined channel 4.

Preferably, the first inclined channel 3 and the second inclined channel 4 are in smooth transition.

According to the above solution, the guide portion 6 is arranged as a channel with different gradient at two ends for facilitating mounting of the filter apparatus, the gradient of the first inclined channel 3 is designed to be large, thus, the filter apparatus 5 can be placed in the drying air duct conveniently, and the filter apparatus 5 is convenient to mount. The horizontal length of the cross section of the guide portion 6 in the horizontal direction is longer than the maximum horizontal length of the projection length of the filter apparatus 5 on the horizontal plane; and the horizontal length of a communication port, communicating with the guide portion 6, of the mounting chamber in the horizontal direction is longer than the projection length of the filter apparatus on the horizontal plane.

According to the above solution, by setting the cross-sectional dimension of the guide portion 6 in the horizontal direction, the filter apparatus 5 can enter the guide portion 6 favorably, normal mounting of the filter apparatus 5 is ensured, when the guide portion 6 is of the inclined structure, the horizontal length of the communication port, communicating with the guide portion 6, of the mounting chamber in the horizontal direction is longer than the projection length of the filter apparatus 5 on the horizontal plane, and thus the effect that the filter apparatus 5 can enter the mounting chamber through the guide portion 6 is ensured. Preferably, the filter apparatus 5 is of the sheet structure, and the horizontal length of the communication port in the horizontal direction is greater than the length of the diagonal of the sheet structure.

Preferably, the filter apparatus 5 comprises a frame 52, a filter net 51 arranged in the frame 52, and a handle part 53. The handle part 53 is arranged on the frame 52 and located in the same plane as the filter net 51. The handle part 53 faces the air inlet of the drying air duct, and thus a user can grasp the handle part 53 conveniently so as to take the filter apparatus out.

Preferably, an air inlet filter apparatus is arranged at the air inlet of the drying air duct;

Preferably, the air inlet filter apparatus is inserted into and fixed at the air inlet of the drying air duct through the air inlet and performs primary filtering in the drying process, and secondary filtering is performed via the filter apparatus mounted in the drying air duct, so that the filtering effect is improved.

Alternatively, the front support 1 is provided with an insertion port connected to the drying air duct, and the air inlet filter apparatus is inserted into the air inlet through the insertion port, Alternatively, the air inlet filter apparatus is mounted on the upper portion of the air inlet in a covering mode and covers the air inlet so as to block clothes.

Preferably, the number of the meshes of the filter net of the air inlet filter apparatus is smaller than the number of the meshes of the filter apparatus arranged in the drying air duct. In the drying process, the air inlet filter apparatus performs primary filtering on the thread scraps and filters the large thread scraps, the filter apparatus arranged in the drying air duct is used for filtering the tiny thread scraps entering the drying air duct from the air inlet filter apparatus, the two-stage filter apparatuses cooperate for filtration, and a good filtration effect can be achieved.

Certainly, the air inlet filter apparatus may be wholly arranged in the drying air duct and located at an upstream position of the filter apparatus 5.

The above descriptions are only the preferred embodiments of the present disclosure, and are not intended to limit the present disclosure in any form. Although the present disclosure has been disclosed as above with the preferred embodiments, the present disclosure is not limited thereto. Any skilled person familiar with the patent may can make some changes or modifications to equivalent embodiments with equivalent changes without departing from the technical solutions of the present disclosure based on the technical content suggested above. Any simple modifications, equivalent changes and modifications made to the above embodiments in accordance with the technical essence of the present disclosure without departing from the content of the technical solutions of the present disclosure still fall within the scope of the technical solutions of the present disclosure.

The invention claimed is:

1. A clothes dryer, comprising:
a front support; and
a filter apparatus, wherein the front support is provided with a drying air duct, the drying air duct including,
an air outlet communicated with a circulation air duct arranged inside the clothes dryer,
an air inlet communicated with a clothes treating chamber of the clothes dryer, and
a mounting chamber and a guide portion for guiding the filter apparatus to be inserted into/removed from the mounting chamber, wherein
the guide portion is connected to the mounting chamber and is an oblique channel,
the filter apparatus is of a sheet structure, the filter apparatus including two sides having edges configured to contact with the guide portion when inserting or removing the filter apparatus, the edges of the filter apparatus are beveled and parallel to each other,
the mounting chamber is matched with the filter apparatus in shape,
the filter apparatus is wholly mounted in the mounting chamber and covers a cross section of the mounting chamber.

2. The clothes dryer according to claim 1, wherein
the mounting chamber is aligned with the air outlet of the drying air duct, and
the filter apparatus is mounted in the mounting chamber and covers the air outlet.

3. The clothes dryer according to claim 1, wherein the guide portion comprises a first inclined channel and a second inclined channel communicating with each other, an inlet of the first inclined channel is the air inlet, and
a gradient of the first inclined channel is greater than a gradient of the second inclined channel.

4. The clothes dryer according to claim 1, wherein a length of a cross section of the guide portion in a horizontal direction is longer than a maximum horizontal length of a projection length of the filter apparatus on a horizontal plane; and
a horizontal length of a communication port, communicating with the guide portion, of the mounting chamber in the horizontal direction is longer than the projection length of the filter apparatus on the horizontal plane.

5. The clothes dryer according to claim 1, wherein the filter apparatus comprises a frame, a filter net arranged in the frame, and a handle part, and
the handle part is arranged on the frame and located in a same plane with the filter net.

6. The clothes dryer according to claim 1, wherein an air inlet filter apparatus is arranged at the air inlet of the drying air duct; and
the air inlet filter apparatus is of a sheet structure, the air inlet filter apparatus is fixed at the air inlet of the drying air duct through the air inlet, or
the front support is provided with an insertion port connected to the drying air duct, and the air inlet filter apparatus is inserted into the air inlet through the insertion port, or
the air inlet filter apparatus is mounted on an upper portion of the air inlet in a covering mode and covers the air inlet.

* * * * *